US006282763B1

(12) United States Patent
Goria

(10) Patent No.: US 6,282,763 B1
(45) Date of Patent: Sep. 4, 2001

(54) BURIAL CONTAINER AND METHODS OF MAKING

(76) Inventor: Pierre A. Goria, P.O. Box 39, McLeansville, NC (US) 27301

(*) Notice: Subject to any disclaimer, the term of this patent is extended or adjusted under 35 U.S.C. 154(b) by 0 days.

(21) Appl. No.: 09/399,410

(22) Filed: Sep. 20, 1999

(51) Int. Cl.$^7$ .................................................. A61G 17/00
(52) U.S. Cl. ................................ 27/35; 52/135; 264/256
(58) Field of Search .................................. 27/35, 2, 3, 7; 264/256; 52/128, 135

(56) References Cited

U.S. PATENT DOCUMENTS

| 3,439,461 | * | 4/1969 | Chandler et al. | 27/35 |
| 3,839,768 | * | 10/1974 | McQuestion | 27/35 X |
| 4,060,581 | * | 11/1977 | Darby et al. | 264/256 X |
| 4,261,083 | * | 4/1981 | Darby et al. | 27/35 |
| 4,314,390 | * | 2/1982 | Darby et al. | 27/35 |
| 5,245,733 | * | 9/1993 | Goria | 27/35 |
| 5,321,873 | * | 6/1994 | Goria | 27/35 |

* cited by examiner

*Primary Examiner*—B. Dayoan
*Assistant Examiner*—William L. Miller

(57) ABSTRACT

A molded burial container and method for forming such having a seamless single piece base with a bottom, sides and ends, each of which has an inner wall and an outer wall and a seamless single piece lid having an inner and outer wall, the lid being releasably securable to the base. A coarse aggregate of the moldable material is fused into the interior side of the base and lid inner and outer walls during the molding process as formation of the base and lid is completed. The base and lid inner and outer walls thus form hollow chambers capable of being filled with a structural flowable material such as cellular concrete or structural foam so that the flowable material bonds to the aggregate covered interior side of the inner and outer walls of the base and lid.

11 Claims, 3 Drawing Sheets

BURIAL CONTAINER AND METHODS OF MAKING

BACKGROUND OF THE INVENTION

1. Field of the Invention

The present invention relates generally to burial containers and methods for forming same and is particularly concerned with burial container having a seamless single piece double wall base and lid forming hollow chambers therein, the interior side of each double wall having a coarse aggregate fused thereto to bond with a flowable structural material such as concrete or foam introduced into the formed chambers for additional structural strength and/or weight.

2. Description of the Prior Art

Concrete burial vaults are porous and thus, under soil load pressure, will eventually permit the flow of moisture into the vault interior. Attempts have been made to line such vaults with plastic or fiberglass shells, however the continued pressure of soil load will eventually cause moisture to move through pores of the concrete and separate the interior shell from the concrete to which it was originally adhered.

A number of approaches have been taken to cover or shroud concrete burial vaults with plastic in order to provide a better barrier to the flow of matter into the vault interior. These approaches for the most part are directed to a technique for adhering the liner to the concrete interface. See for example U.S. Pat. No. 3,439,461 (Chandler) which describes the application of a wet and tacky adhesive onto the surfaces of a plastic liner placed on a mold for filing with concrete so that the adhesive and the concrete will cure together and be bonded at the interface. While this is an improvement in previous techniques, there is still a tendency for the liner to separate from the concrete and permit the entry of moisture.

U.S. Pat. No. 3,839,768 (McQuestion) seeks to overcome the manufacturing steps required to use adhesive as the adhering means at the plastic to concrete interface by attaching fiberglass loops to the surfaces of a resinous liner so that when the mold is filled with concrete, the loops will be embedded in the concrete. This has been successful to a degree, however the manufacturing process is involved and costly.

U.S. Pat. No. 4,060,581 (Darby) is directed to overcome the problem arising when some of the wet and tacky adhesive pre-applied to the surfaces of a plastic liner is scrubbed away when the concrete is poured into the mold. It calls for adhering aggregate to surfaces of the plastic liner so that when the mold is filled with concrete and the concrete cured, the pre-applied aggregate provides the adhering means at the plastic to concrete interface.

While these approaches have resulted in improvements in vault construction, there is still a need for a more efficient and less costly manufacturing operation and a more secure bonding between the container surface and the concrete interface. It is to this need that the present invention is directed.

SUMMARY AND OBJECTIVES OF THE INVENTION

The present invention is a burial vault and a method for forming the burial vault preferably by simple rotational molding wherein a seamless single piece base is formed having inner and outer walls that create a hollow chamber capable of being filled with a flowable structural material. The lid is formed in the same manner. During the molding process, a coarse aggregate of a harder form of the molding substance is introduced into the mold so that it becomes fused to the interior surface of the inner and outer walls of the base and lid upon completion of the molding. The fused coarse aggregate thereby provides for flowable concrete to bond mechanically to the flowable structural material to form a rigid and inseparable junction.

From the summary, it can be seen that a primary objective of the present invention is to provide a burial container which may be produced by simple rotational molding and filling techniques which do not require adhesive binding agents, special climate controls, and precise manufacturing procedures combining various elements to form an ultimate defined structure.

Another objective of the present invention is to provide a new and improved seamless hollow wall burial container, the lid and base of which are light in weight can be readily handled and transported economically over substantial distances and can be filled at the grave site or centrally established locations with a structural flowable material.

Still a further objective of the present invention is to provide a molded double wall structure concrete interface that will not separate or become loose when exposed to moisture and pressure.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways. It is also to be understood that the phraseology and terminology employed herein are for the purpose of description and should not be regarded as limiting in any respect. Those skilled in the art will appreciate that the concept upon which this disclosure is based may readily be utilized as a basis for designing of other structures, methods and systems for carrying out the several purposes of the development. Examples of other uses of the present inventive concept include ice coolers, water coolers, food coolers, boats and any other article utilizing a double wall construction which need additional structural strength or weight.

It is important the claims be regarded as including such equivalent processes and products resulting therefrom that do not depart from the spirit and scope of the present invention. The application is neither intended to define the invention of the application, which is measured by its claims, nor to limit its scope in any way. Thus, the objectives of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

DETAILED DESCRIPTION OF THE INVENTION

Figure 1:
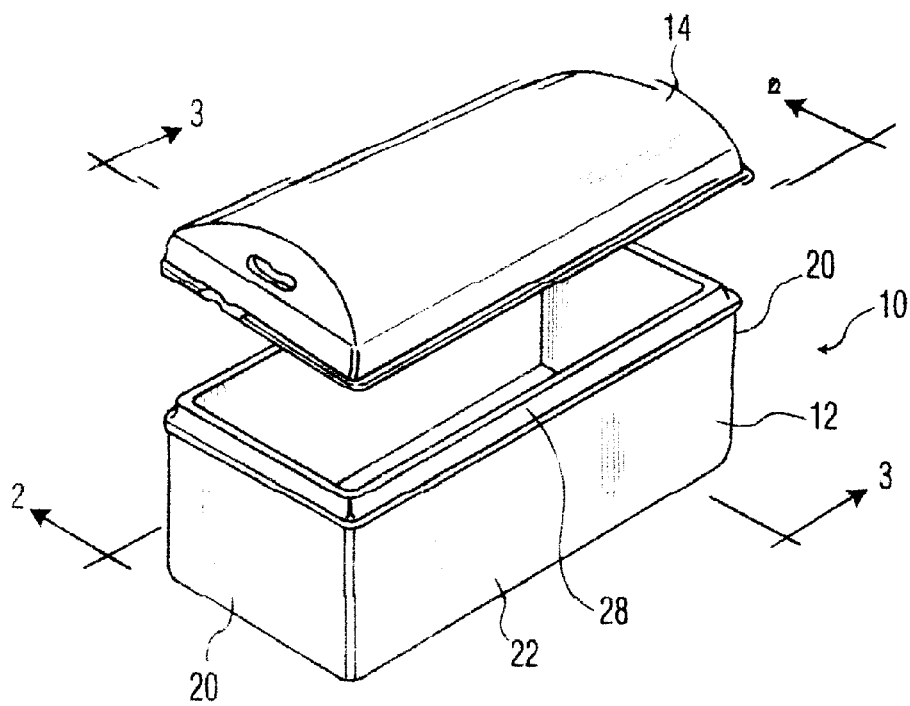
FIG. 1 is a perspective view showing the burial vault of the present invention with the base and lid in a separated or exploded relationship.
Figure 2:
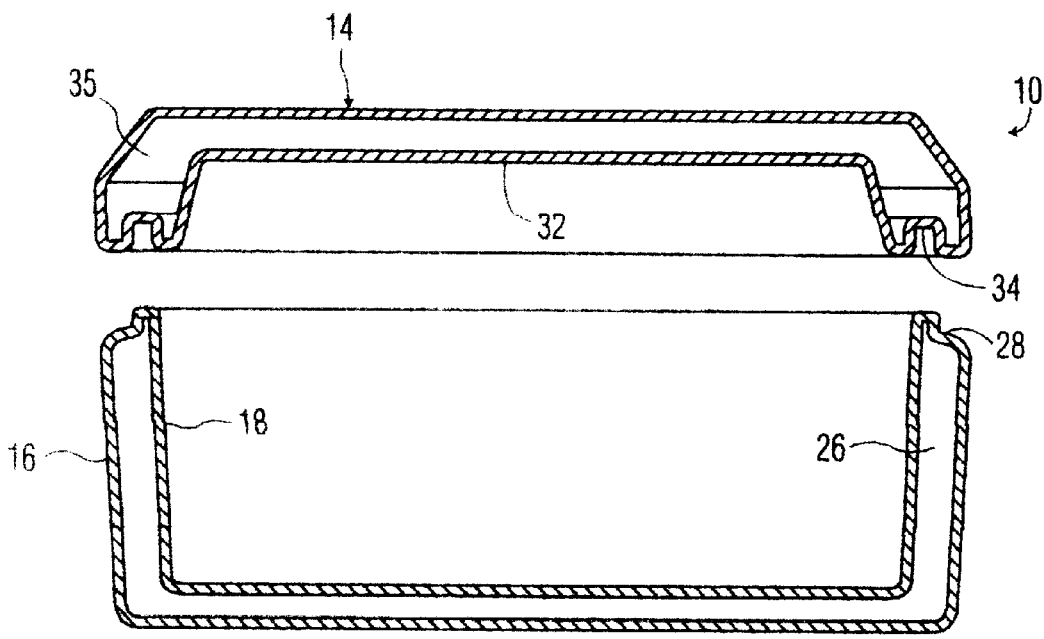
FIG. 2 is side elevational cross-sectional view taken substantially along line 2—2 in FIG. 1.
Figure 3:
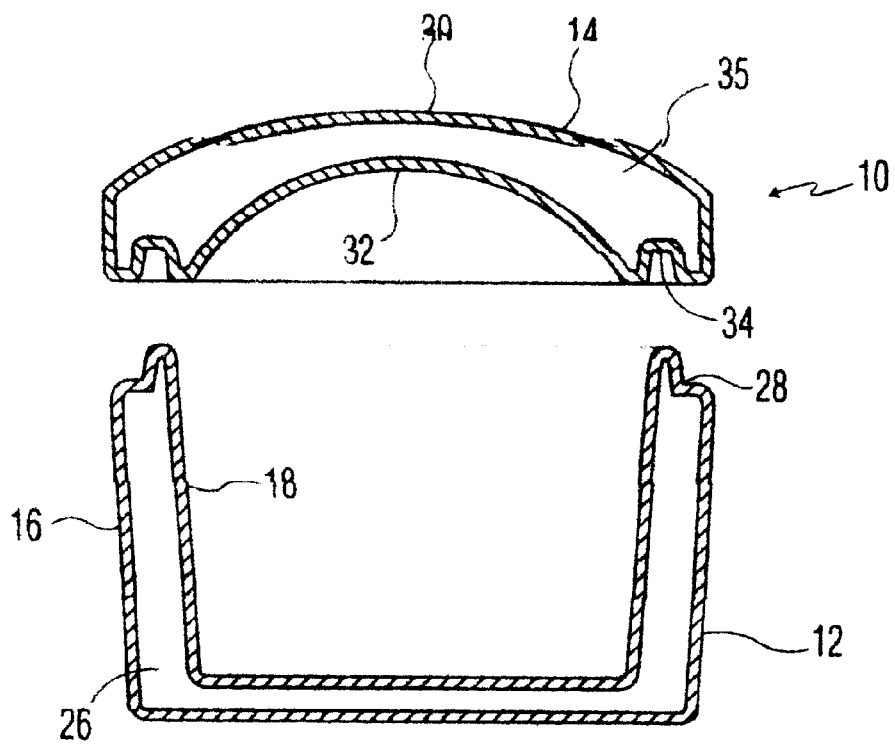
FIG. 3 is and end elevational cross-sectional view taken substantially along line 3—3 in FIG. 1.
Figure 4:
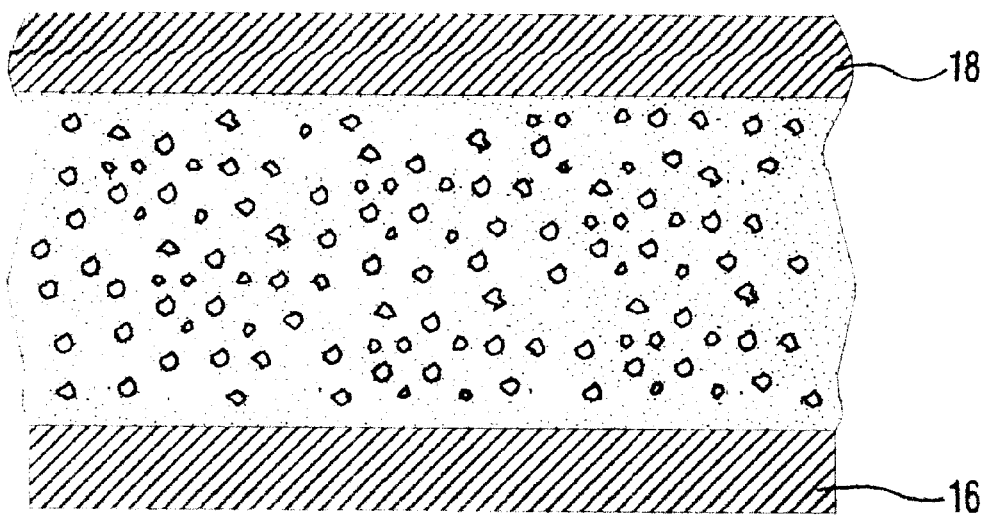
FIG. 4 is a partial cross-sectional view showing the junction between the coarse aggregate fused and covered interior of the inner and outer walls of the base and lid and the cement and enlarged for clarity.
Figure 5:
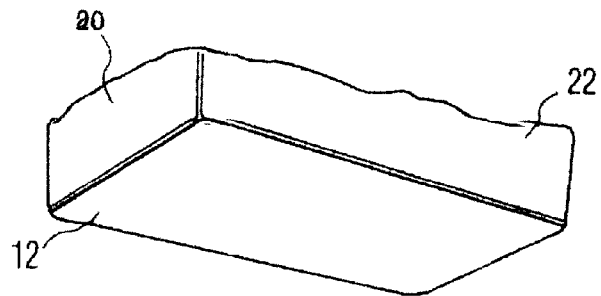
FIG. 5 is a bottom perspective view showing the bottom of the base of the present invention.
Figure 6:
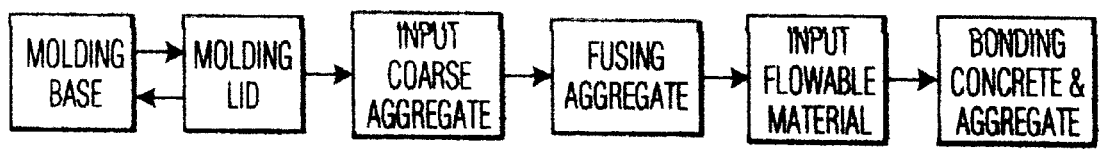
FIG. 6 is block diagram illustrating the steps of the method comprising the present invention.
Figure 7:
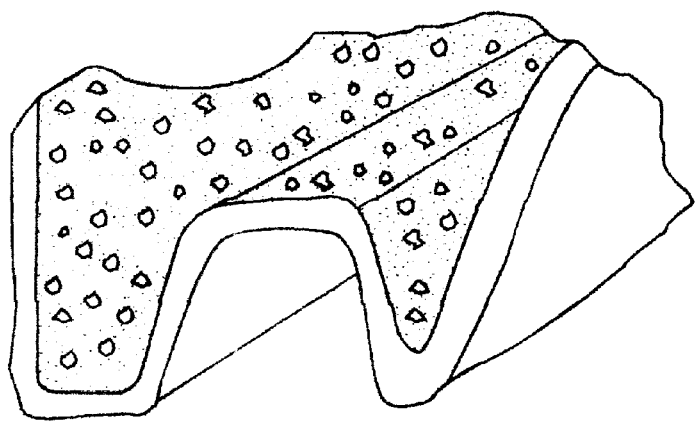
FIG. 7 is a perspective fragmentary view of a section of a chamber interior wall showing the fused coarse aggregate.

Referring now to the drawings and particularly to FIG. 1, a composite burial vault shown generally as 10 includes a base 12 and a lid 14. Base 12 has an outer wall 16 and an inner wall 18, outer wall 16 and inner wall 18 forming at various locations on base 12 opposing end walls 20, opposing side walls 22, and a bottom 12.

Inner wall 18 is positioned inwardly from and substantially parallel to outer wall 16 so that a cavity 26 is formed between wall 16, 18 around the entire periphery of base portion 12. A web or engaging edge 28 is formed across the upper open end of inner wall 18 and outer wall 16.

Lid 14 of vault 10 is constructed in a similar manner as base 12. Specifically, lid 14 includes an outer wall 30 and an inwardly spaced inner wall 32. A web 34 is formed to register with vault web 28 between the downwardly extending open end of walls 30, 32 so that a chamber is formed within lid 14.

Base 12 and lid 14 are preferably formed by rotational molding in which a preferably polymetric heat activated moldable substance in the form of a finely ground powder is positioned within an enclosed mold and selectively heated as the mold is rotated to activate the moldable substance over a period of time and cause it to melt and adhere to the interior surface of the mold in an evenly deposited manner forming a molded product. Heating continues until the powder is completely activated and forms the molded product on the interior surface of the mold. Thereafter, rotation of the mold and formed product continue through a cool down period until the molded product cures and can be removed from the mold.

The moldable material is selected to form the molded product based on its flowable characteristics after it has reached a melting temperature. It is desired that all of the powdered substance be utilized in the molding process so that the molded product is smooth on its inner and outer sides and carries no residue of powder or crystals. The utilization of rotational molding to form the present invention enables the efficient and short time production of the seamless single piece base and lid of the present invention with the formation of hollow chambers 26, 35 within which can be introduced a flowable structural material to complete a high strength, double walled, moisture resistant burial vault.

To ensure the provision of an efficient, pressure and moisture resistant interface between the interior walls of the outer wall 16 and inner wall 18 with the flowable structural material and to give additional structural strength to the product by tying the walls together, it has been found effective to introduce into the mold, during the molding process, a coarse aggregate of the molding material used to make the molded product having the same or a higher molecular weight than the molding material being used to form base 12 and lid 14. The higher molecular weight results in a higher melting point and a less flowable tendency so that the coarse aggregate essentially resists becoming a part of the molding process and does not melt or at least only slightly melts to the extent that it becomes fused in the molded material forming the molded product as the molding process continues. When molding is complete, the aggregate is fused to the base and lid chamber inner surfaces and becomes essentially a part of that surface. Because of the irregular configurations of the aggregate particles, ledges, overhangs and other crevices are present which enables flowable structural material to flow around, into and over the aggregate particles and thus, when cured, becomes bonded thereto.

A similar result can be obtained using an aggregate having the same molecular weight as the molding material being used to form base 12 and lid 14 by making the aggregate coarser so that it will not be able to totally melt but will partially melt and again fuse with the molded material forming the molded product as the molding process continues.

Another similar effect can be achieved during the cooling stage of the process. During cooling, the material forming the molded product is still in a semi-melted state and could receive at that time a larger sized aggregate of the same molding material having the same molecular weight. It could also receive any substantially inert foreign substance in aggregate form which would become embodied in the semi-melted walls of the molded product and become fused therewith.

The method of the present invention for rotationally molding the composite burial vault with a polymetric heat activated moldable substance having a selected molecular weight includes initially molding a seamless single piece base having an inner and outer wall bottom and inner and outer wall sides and ends and thereafter molding a seamless single piece lid having the same characteristics which is securable to the base. As the moldable substance is being heat activated during the molding process, a coarse aggregate of the moldable substance having a higher molecular weight than the molecular weight of the moldable substance is introduced into the mold so that as molding is completed, the aggregate particles become fused and integrally associated with the molded interior surface of the molded product and thus a part thereof. Some activation of the aggregate particles nearest the interior surface of the molded product takes place so that that part of the aggregate particles and the interior surface of the molded product actually become integrally fused with and of the same substance. The result is that the interior surface of the molded product has a fused and covering random accumulation of coarse aggregate moldable material which will engage flowable structural material introduced into the cavity and bond with it to form a rigid base and lid construction.

Polymetric materials include, most importantly, polyethylene, and then acceptably, polycarbonates, polypropylene, plastsol, and polyvinyl chloride. Other suitable materials include acrylonitrile-butadiene-styrene (need full chemical name) and nylon.

Obviously any number of appropriate means can be used to join lid 14 with base 12 including sealants, cement, or bolts or screws of appropriate dimension and design. A number of these are shown in my earlier U.S. Pat. No. 5,245,733.

An embodiment of the burial device and a method for producing it have been illustrated and described in operable form. It is to be realized that optimum dimensional relationships for the parts of the invention to include variations and size, materials, shape, form, function and manner of operation, assembly and use are deemed readily apparent and obvious to one skilled in the art. All equivalent relationships to those illustrated in the drawings and described in the specification are intended to be encompassed herein. The foregoing is considered as illustrative only of the principles of the invention. Numerous modifications and changes will readily occur to those skilled in the art, and it is not desired to limit the invention to the exact construction and operation shown and described. All suitable modifications and equivalents that fall within the scope of the appended claims are deemed within the present inventive concept.

What is claimed is:

1. A method of forming a composite burial vault comprising the steps of: forming a seamless single piece base having an inner and outer wall bottom and inner and outer wall sides and ends from a moldable material; introducing during molding a coarse aggregate of the moldable material between the inner and outer walls of the base; forming a single piece lid having inner and outer walls from the moldable material; introducing during molding a coarse aggregate of the moldable material between the inner and outer walls of the lid, the base and lid being cooperatively connectable to form the composite vault and the base and lid inner and outer walls forming hollow chambers capable of being filled with a flowable structural material so that the flowable material bonds to the aggregate covered inner and outer walls of the base and lid.

2. The method as claimed in claim 1 wherein the flowable structural material is adapted to mechanically bond to the aggregate covered inner and outer walls of the base and lid.

3. The method as claimed in claim 1 wherein the moldable material is polyethylene.

4. A method of rotationally molding a composite burial vault with a polymetric heat activated moldable material having a selected molecular weight comprising the steps of: molding a seamless single piece base having an inner and outer wall bottom, and inner and outer wall sides and ends; introducing a coarse aggregate of the moldable material having a higher molecular weight than the moldable material with the selected molecular weight in the base while molding is underway and not completed so that the coarse aggregate is at least partially activated and fused to the inner and outer walls of the base upon completion of molding; molding a seamless single piece lid having inner and outer walls from the moldable material; introducing during molding a coarse aggregate of the moldable material having a higher molecular weight than the moldable material with the selected molecular weight in the lid while molding is underway and not completed so that the coarse aggregate is at least partially activated and fused to the inner and outer walls of the lid upon completion of molding, the base and lid being cooperatively connectable with each other to form the vault and the base and lid inner and outer walls forming hollow chambers capable of being filled with flowable structural material so that the flowable structural material bonds with the coarse aggregate fused and covered inner and outer walls of the base and lid.

5. The method as claimed in claim 2 wherein the flowable structural material is adapted to mechanically bond to the aggregate fused and covered inner and outer walls of the base and lid.

6. The method as claimed in claim 2 wherein the moldable material is polyethylene.

7. A burial vault formed from a moldable polymetric material having a selected molecular weight comprising: a molded seamless single piece base having an inner and outer wall bottom, and inner and outer wall sides and ends; a seamless single piece lid having inner and outer walls securable to the base; a coarse aggregate of the moldable material being at least partially activated and fused to the inside of the inner and outer walls of the base and lid during molding, the base and lid inner and outer walls forming hollow chambers capable of being filled with flowable structural material so that the flowable structural material bonds to the aggregate fused and covered inner and outer walls of the base and lid.

8. The burial vault as claimed in claim 7 wherein the moldable material forming the base and lid has a selected molecular weight and the coarse aggregate of the moldable material has a higher molecular weight.

9. A burial vault made of a polymetric heat activated moldable substance having a selected molecular weight made by molding a seamless single piece base forming an inner and outer wall bottom and inner and outer wall sides and ends; molding a seamless single piece lid having inner and outer walls securable to the base; introducing a coarse aggregate of the moldable substance in the base and lid while molding is under way and not completed so that the unprocessed coarse aggregate is fused to the inner and outer walls of the bane and lid upon completion of molding, the base and lid forming hollow chambers capable of being filled with flowable structural material so that the flowable structural material bonds to the coarse aggregate fused and covered inner and outer wall sides of the base and lid.

10. The vault as claimed in claim 9 wherein the flowable structural material is adapted to mechanically bond to the aggregate fused and covered inner and outer walls of the base and lid and the coarse aggregate has a higher molecular weight than the moldable substance with the selected molecular weight.

11. A burial vault formed from a moldable polymetric material having a selected molecular weight comprising: a molded seamless single piece base having an inner and outer wall bottom, and inner and outer wall sides and ends; a seamless single piece lid having inner and outer walls securable to the base; a coarse aggregate of the moldable material fused to the inside of the inner and outer walls of the base and lid during molding of the base and lid, the base and lid inner and outer walls forming hollow chambers capable of being filled with flowable structural material so that the flowable structural material bonds to the aggregate covered and fused inner and outer walls of the base and lid.

* * * * *